United States Patent
Son et al.

(10) Patent No.: US 8,952,962 B2
(45) Date of Patent: Feb. 10, 2015

(54) GRAPHICS PROCESSING METHOD AND APPARATUS USING POST FRAGMENT SHADER

(75) Inventors: Sung Jin Son, Gyeonggi-do (KR); Seok Yoon Jung, Seoul (KR); Shi Hwa Lee, Seoul (KR); Sang Oak Woo, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 114 days.

(21) Appl. No.: 13/443,468

(22) Filed: Apr. 10, 2012

(65) Prior Publication Data

US 2013/0063440 A1  Mar. 14, 2013

(30) Foreign Application Priority Data

Sep. 14, 2011 (KR) .......................... 10-2011-0092352

(51) Int. Cl.
| | |
|---|---|
| *G06T 15/50* | (2011.01) |
| *G06T 15/60* | (2006.01) |
| *G06T 1/20* | (2006.01) |
| *G06T 15/00* | (2011.01) |

(52) U.S. Cl.
CPC .................................. *G06T 15/005* (2013.01)
USPC ......................................... 345/426; 345/506

(58) Field of Classification Search
CPC ........... G06T 1/00–1/0092; G06T 1/20; G06T 15/50–15/506; G06F 15/00; G09G 5/00–5/008
USPC .................................. 345/426, 501, 611, 506
See application file for complete search history.

(56) References Cited

U.S. PATENT DOCUMENTS

| | | | |
|---|---|---|---|
| 6,809,732 B2 | 10/2004 | Zatz et al. | |
| 8,063,900 B1* | 11/2011 | O'Donnell | 345/421 |
| 8,203,564 B2* | 6/2012 | Jiao et al. | 345/506 |
| 2003/0002729 A1* | 1/2003 | Wittenbrink | 382/154 |
| 2008/0024506 A1 | 1/2008 | Lindholm et al. | |
| 2008/0074428 A1 | 3/2008 | Bakalash et al. | |
| 2009/0265528 A1 | 10/2009 | Du et al. | |
| 2010/0091018 A1 | 4/2010 | Tatarchuk et al. | |
| 2010/0184518 A1 | 7/2010 | Sylla | |

FOREIGN PATENT DOCUMENTS

| | | |
|---|---|---|
| KR | 10-0817920 | 3/2008 |
| KR | 10-2008-0074428 | 8/2008 |
| KR | 10-2009-0045349 | 5/2009 |
| KR | 10-2009-0097816 | 9/2009 |
| KR | 10-2010-0003518 | 1/2010 |
| KR | 10-2010-0068603 | 6/2010 |
| KR | 10-0965637 | 6/2010 |
| KR | 10-0995157 | 11/2010 |
| KR | 10-1009521 | 1/2011 |
| KR | 10-1009557 | 1/2011 |
| KR | 10-2011-0016938 | 2/2011 |
| KR | 10-2011-0019764 | 2/2011 |
| KR | 10-2011-0020411 | 3/2011 |
| KR | 10-2011-0049734 | 5/2011 |

* cited by examiner

*Primary Examiner* — Jacinta M Crawford
(74) *Attorney, Agent, or Firm* — NSIP Law

(57) ABSTRACT

Provided is a graphics processing method and apparatus using a post fragment shader. A rendering pipeline of the graphics processing apparatus may include a fragment shader that operates before a raster operator, and a post fragment shader that operates after the raster operator. Each of the fragment shader and the post fragment shader may apply a different effect to each of a plurality of fragments.

20 Claims, 5 Drawing Sheets

GRAPHICS PROCESSING METHOD AND APPARATUS USING POST FRAGMENT SHADER

CROSS-REFERENCE TO RELATED APPLICATIONS

This application claims the priority benefit of Korean Patent Application No. 10-2011-0092352, filed on Sep. 14, 2011, in the Korean Intellectual Property Office, the disclosure of which is incorporated herein by reference.

BACKGROUND

1. Field

Example embodiments of the following description relate to a method and apparatus for graphics processing, and more particularly, to a graphics processing method and apparatus using a post fragment shader.

2. Description of the Related Art

With development in technology associated with three-dimensional (3D) graphics, even games created by 3D graphics may use realistic images typically seen only in the field of movies. Accordingly, a graphics processing unit (GPU) has been transformed from a hardware structure of performing a fixed operation to a programmable structure. Due to the above transformation, the GPU may employ a vertex shader and a fragment shader as constituent elements.

Since the application of the render-man shader effect to games, which was previously available only in the field of movies and animations, images of games have been dramatically enhanced. The render-man shader effect may include a phong shader, a displacement shader, a bump-map, and the like.

The programmability of the GPU may need to be extended in order to provide programmability in other areas in addition to the vertex shader and the fragment shader. This aspect can be shown in that an open graphics library (OpenGL) adopts a geometry shader and a tessellation shader as a standard.

The programmability of high performance GPU has extended an area of the GPU up to the field of a general-purpose computing on graphics processing unit (GPGPU) as well as the field of graphics. Examples of the above extension may include an open computation language (OpenCL), a compute unified device architecture (CUDA), and the like.

Accordingly, there is a desire for adding a variety of programmability to a GPU to create a more realistic image.

SUMMARY

The foregoing and/or other aspects are achieved by providing a graphics processing apparatus, including a fragment shader to apply a first effect to each of fragments, a raster operator to generate a raster image based on information about the fragments, and a post fragment shader to apply a second effect to each of fragments within the raster image.

The graphics processing apparatus may further include a rasterizer to generate fragments within a vertex by interpolating texture coordinates and screen coordinates that are defined in each vertex within a primitive.

The graphics processing apparatus may further include a primitive processor to generate the vertex, a vertex shader to generate vertex data by transforming a three-dimensional (3D) position of the vertex within a virtual space to two-dimensional (2D) coordinates and a depth value that are displayed on a screen, and a primitive assembly to collect a run of the vertex data, and to configure the primitive using the collected run.

The second effect may correspond to a per-fragment effect to be applied to each of the fragments within the raster image, based on information about the raster image.

The second effect may include at least one of a motion blurring effect, an anti-aliasing effect, a depth of field effect, and a blooming filter effect.

The fragment shader may perform deferred shading by computing a color of each of the fragments within the raster image when the raster operator performs a raster operation.

The graphics processing apparatus may further include a first switch to switch on or off the fragment shader, and a second switch to switch on or off the post fragment shader.

The graphics processing apparatus may further include a memory to store the raster image as a frame buffer object.

The post fragment shader may access the fragments that are generated by the fragment shader through the frame buffer object.

Information about the fragments may be transferred from the fragment shader to the post fragment shader through a varying.

The foregoing and/or other aspects are achieved by providing a graphics processing method, including applying a first effect to each of fragments, generating a raster image based on information about the fragments, and applying a second effect to each of fragments within the raster image.

The graphics processing method may further include generating fragments within a vertex by interpolating texture coordinates and screen coordinates that are defined in each vertex within a primitive.

The graphics processing method may further include generating the vertex, generating vertex data by transforming a 3D position of the vertex within a virtual space to 2D coordinates and a depth value that are displayed on a screen, and collecting a run of the vertex data to configure the primitive using the collected run Additional aspects of embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Figure 1:
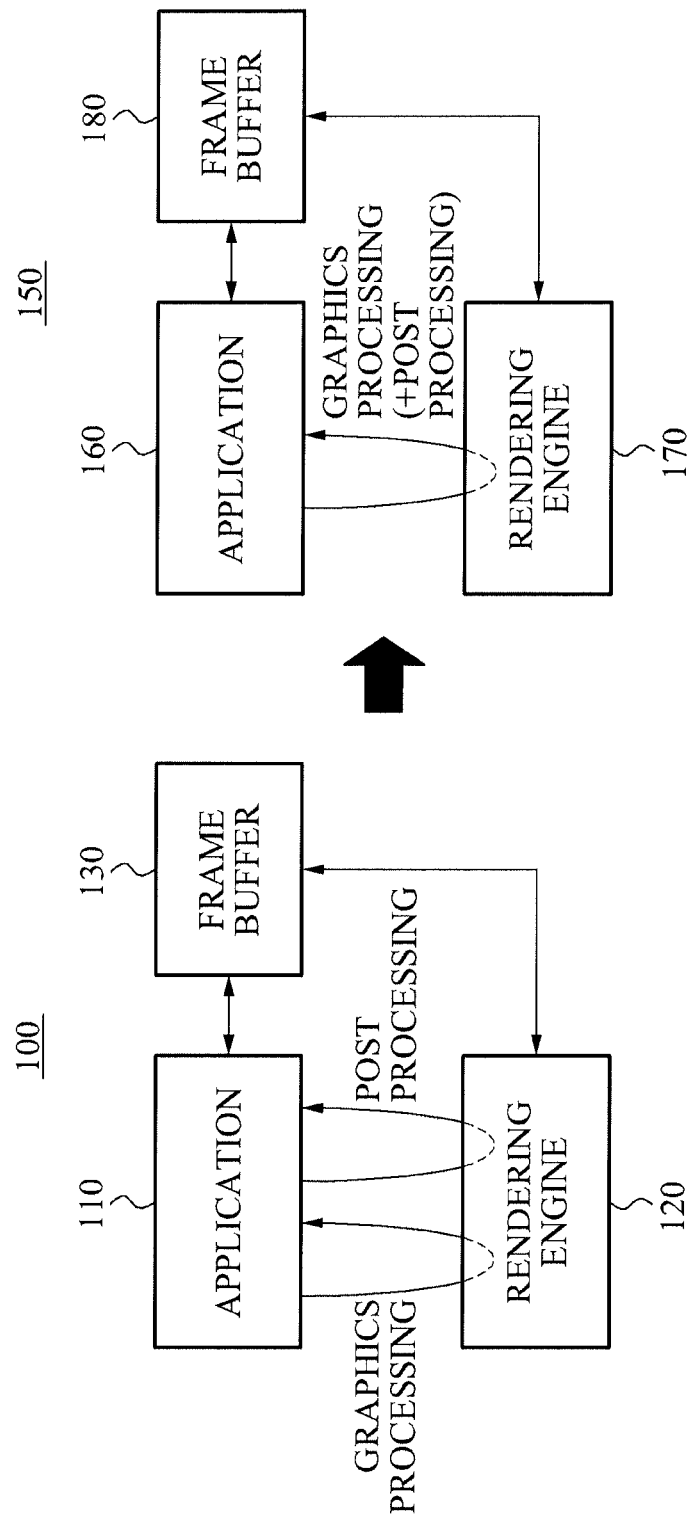
FIG. 1 illustrates a configuration of a rendering engine according to example embodiments.

Reference will now be made in detail to embodiments, examples of which are illustrated in the accompanying drawings, wherein like reference numerals refer to like elements throughout. Embodiments are described below to explain the present disclosure by referring to the figures.

In the following embodiments and examples, the terms "fragment" and "pixel" have the same meaning and thus, may be exchanged with each other and interchangeably used.

The following embodiments and examples may be applied to a three-dimensional (3D) rendering method and apparatus using a programmable shader.

FIG. 1 illustrates a configuration of a rendering engine according to example embodiments.

Referring to FIG. 1, a first graphics processing apparatus 100 corresponds to a graphics processing apparatus using a conventional rendering engine 120.

The first graphics processing apparatus 100 may include an application 110, the rendering engine 120, and a frame buffer 130. The application 110 may be a user program and may control and use the rendering engine 120 as needed. The application 110 may indicate a portion associated with a control and a use of the rendering engine 120 in the user program.

The rendering engine 120 may perform rendering. The rendering engine 120 may be a graphics processing unit (GPU) or a portion of the GPU.

The frame buffer 130 may be a video display device to drive a video display from a memory buffer that includes a complete data frame.

The application 110 may request the rendering engine 120 for graphics processing. In response to the graphics processing request, the rendering engine 120 may sequentially apply a fragment shader and a raster operation to fragments. The rendering engine 120 may generate a raster image by applying a raster operation to the fragments.

When processing the graphics processing request, the rendering engine 120 may render the raster image to a frame buffer object.

A post processing effect applicable to the raster image, that is, fragments within the raster image may include motion blurring, anti-aliasing, depth of field, blooming filter, and the like. The post processing effect may include an effect that is applicable after the whole raster image is generated. However, within a pipeline of the rendering engine 120, a raster operator may be positioned at a position followed by the fragment shader. Therefore, to apply the post processing effect, the application 110 may need to request again the rendering engine 120 for post processing of the raster image, that is, the fragments within the raster image. When processing the post processing request, the rendering engine 120 may restart the whole rendering process from the beginning in order to compute an additional effect with respect to a fragment.

When processing the post processing request, the rendering engine 120 may render the raster image applied with the post processing effect using the frame buffer 130.

A second graphics processing apparatus 150 may include an application 160, a rendering engine 170, and a frame buffer 180.

The rendering engine 170 may include an additional fragment shader. The additional fragment shader may correspond to a fragment shader for applying the post processing effect. Therefore, the additional fragment shader may be referred to as a post fragment shader. Since the rendering engine 170 includes the post fragment shader, the rendering engine 170 may perform graphics processing and post processing within a single rendering process, that is, a pipeline.

Accordingly, the application 160 may request the rendering engine 170 for graphics processing only a single time. The graphics processing request may include a request for the post processing effect.

Hereinafter, the pipeline of the rendering engine 170 will be described with reference to FIG. 2.

In the following, in processing a depth of field effect, the rendering engine 120 and the rendering engine 170 including the post fragment shader will be compared.

The rendering engine 120 may render a focus image and depth information through graphics processing and may store the rendering result within a frame buffer object. Next, the rendering engine 120 may generate a mip-map image from the frame buffer object through post processing. In this example, the mip-map image may indicate a blur image that is generated using a down sample. The rendering engine 120 may render a final image from a mip-map texture based on a depth value.

The rendering engine 170 including the post fragment shader may render an in-focus image and depth information using the fragment shader, may generate a mip-map image from a frame buffer object using the post fragment shader, and may perform shading of a final image from the mip-map image. Accordingly, the rendering engine 170 may remove an additional vertex stage and a rasterization stage for rendering of post processing.

Hereinafter, in processing a deferred shading effect, the rendering engine 120 and the rendering engine 170 including the post fragment will be compared.

The deferred shading effect may be effective with respect to a plurality of light sources. Only final fragments may be shaded within the fragment shader.

The rendering engine 120 may not support the deferred shading effect. On the contrary, the rendering engine 170 including the post fragment shader may support the deferred shading effect. The application 160 may use only the post fragment shader instead of using the fragment shader. The above use may indicate deferred shading. The deferred shading may be applied to an early scissor, a depth test, or a stencil test. That is, for the deferred shading effect, shading may be performed only once with respect to each visible fragment.

Figure 2:
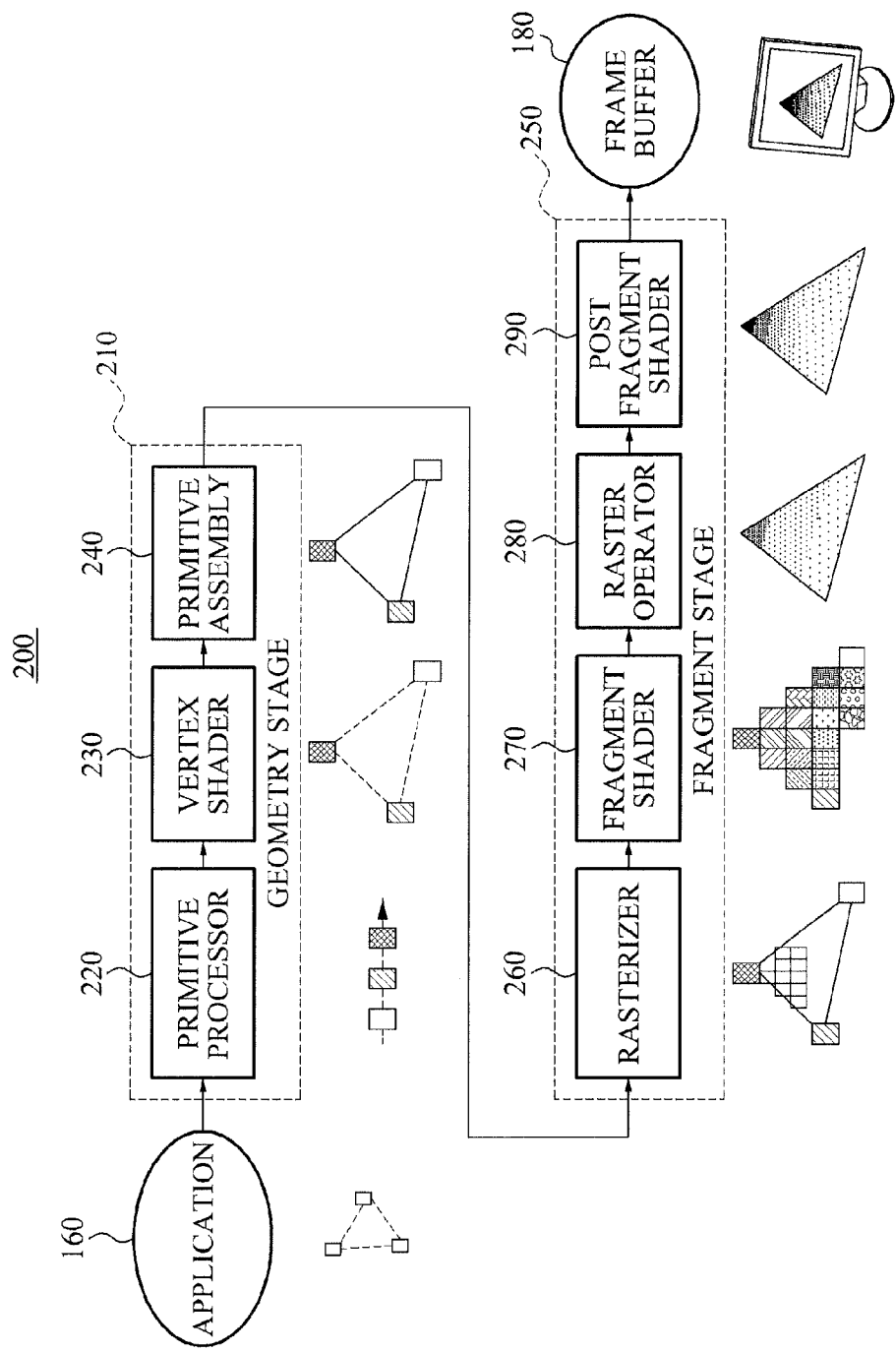
FIG. 2 illustrates a pipeline of a rendering engine according to example embodiments.

FIG. 2 illustrates a pipeline 200 of the rendering engine 170 according to example embodiments.

The pipeline 200 of the rendering engine 170 may indicate that graphics operations with respect to different fragments may be performed in parallel by respective constituent elements, for example, a primitive processor 220, a vertex shader 230, a primitive assembly 240, a rasterizer 260, a fragment shader 270, a raster operator 280, and a post fragment shader 290.

The pipeline 200 may include a geometry stage 210 and a fragment stage 250.

In the geometry stage 210, phase transformation and back-face culling may be performed with respect to a vertex in a space, and coordinates of the vertex may be projected onto a screen. In the fragment stage 250, fragments within a triangle or another polygon constituted by vertices may be generated based on coordinates of the vertices, and a color value of each of the fragments may be computed.

As constituent elements used in the geometry stage 210, the rendering engine 170 may include the primitive processor 220, the vertex shader 230, and the primitive assembly 240.

As constituent elements used in the fragment stage 250, the rendering engine 170 may further include the rasterizer 260, the fragment shader 270, the raster operator 280, and the post fragment shader 290.

Figures disposed below each of the graphics operations illustrated in FIG. 2 conceptually show processing of vertices or fragments in each stage.

The primitive processor 220 may obtain application-specific data and data structures from the application 160, and may generate vertices using the application-specific data and the data structures.

A shader may correspond to a set of software instructions. The shader may be generally used to compute rendering effects in graphics hardware. The shader may be used to program a GPU programmable rendering pipeline.

The vertex shader 230 may be used once for each of vertices given to a GPU, and generate vertex data by transforming a 3D position of each of the vertices within a virtual space to 2D coordinates and a depth value of a Z buffer that are displayed on a screen.

The primitive assembly 240 may collect a run of the vertex data that is output from the vertex shader 230, and configure a viable primitive, for example, a line, a point, a triangle, and the like, using the collected run.

The rasterizer 260 may generate fragments within a vertex by interpolating texture coordinates and screen coordinates that are defined in each vertex within a primitive.

The fragment shader 270 may apply complex per-fragment, (for example, per-pixe), I effects to respective fragments that are generated by performing a code configured through a shader programmer. The fragment shader 270 may compute a color of a fragment by computing texture mapping, light reflection, and the like, or may remove a predetermined fragment using a discard instruction. The discard instruction may correspond to an instruction for removing a predetermined fragment in a pipeline within the fragment shader 270. The removed fragment may not be a target to be rendered any more.

The raster operator 280 may generate a raster image, for example, fragments or dots, based on information about fragments by performing a depth test and color blending.

The post fragment shader 290 may apply the per-fragment effects to respective fragments within the raster image generated by the raster operator 280. The post fragment shader 290 may output, to a frame buffer 180, the raster image that is applied with the per-fragment effects.

The post fragment shader 290 may be used in a general-purpose programmable method for an operation of final fragments. The post fragment shader 290 may be executed with respect to each of the fragments that are generated through the raster operation.

In this example, the pipeline 200 may include two shaders, for example, the fragment shader 270 and the post fragment shader 290, with respect to a fragment. Therefore, the fragment shader 270 may be referred to as a first fragment shader and the post fragment shader 290 may be referred to as a second fragment shader. Also, per-fragment effects applied by the fragment shader 270 may be referred to as first effects and per-fragment effects applied by the post fragment shader 290 may be referred to as second effects.

The second effects may include per-fragment effects to be applied to respective fragments within the raster image by referring to information about the raster image. The second effects may include at least one of a motion blurring effect, an anti-aliasing effect, a depth of field effect, and a blooming filter effect. The first effects may be per-fragment effects which are independent to information about the raster image.

The raster engine 170 may include the post processing process in the pipeline 200. Since the post processing process is included in the pipeline 200, the raster engine 170 may provide multi-pass rendering for the fragment shader operation. Through the multi-pass rendering, when expressing a variety of post processing effects, the raster engine 170 may remove an unnecessary operation and bandwidth use and may quickly generate a high quality image. In addition, through the multi-pass rendering, the raster engine 170 may decrease an unnecessary communication between a host, for example, a central processing unit (CPU) to execute the application 160, and the GPU. The raster engine 170 may also decrease overhead occurring due to the unnecessary communication, and may increase parallelism between the host and the GPU.

Due to the raster operation, the number of fragments to be processed by the post fragment shader 290 may decrease. Therefore, an amount of operations to be processed by the post fragment shader 290 may decrease. In general, since fragment shading may be congested within the pipeline 200, the overall performance of the pipeline 200 may be enhanced according to a decrease in an amount of shading operations to be processed by the post fragment shader 290. In addition, according to the decrease in an amount of shading operations, an access to an external memory and an amount of power used due to the access may also decrease.

The post fragment shader 290 may perform deferred shading by computing a color of each of fragments within the raster image after the raster operator 280 performs the raster operation. Due to the deferred shading, the raster engine 170 may quickly generate an image by decreasing an amount of operations used for shading of the fragments.

Figure 3:
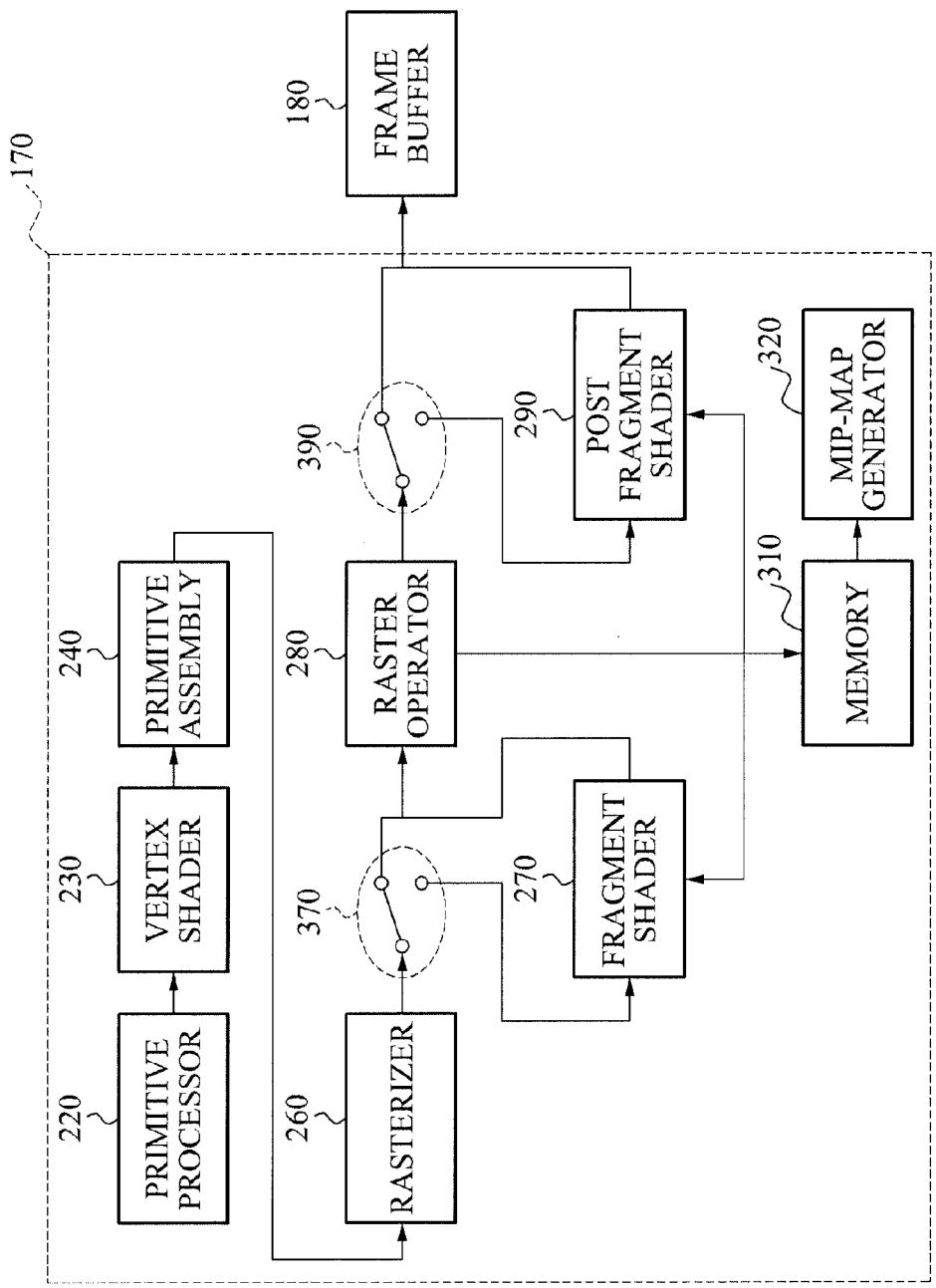
FIG. 3 illustrates a configuration of a raster engine according to example embodiments.

FIG. 3 illustrates a configuration of the raster engine 170 according to example embodiments.

Referring to FIG. 3, the raster engine 170 may include the primitive processor 220, the vertex shader 230, the primitive assembly 240, the rasterizer 260, the fragment shader 270, the raster operator 280, and the post fragment shader 290, as described above.

The raster engine 170 may further include a mip-map generator 320, a first switch 370, and a second switch 390.

The first switch 370 may switch on or off the fragment shader 270. The first switch 370 may bind the fragment shader 270 within the rendering engine 170. For example, the first switch 370 may transfer an output of the rasterizer 260 to one of the fragment shader 270 and the raster operator 280.

The second switch 390 may switch on or off the post fragment shader 290. The second switch 390 may bind the post fragment shader 290 within the rendering engine 170. For example, the second switch 390 may transfer an output of the raster operator 260 to one of the post fragment shader 290 and the frame buffer 180.

In response to a request of the application 160, the rendering engine 170 may control the first switch 370 and the second switch 390 to switch on or off the fragment shader 270 and the post fragment shader 290.

A memory 310 may be a texture memory. The memory 310 may store, as a frame buffer object, a result of a raster operation, for example, a raster image, that is performed by the raster operator 280. The post fragment shader 290 may access predetermined fragments that are generated by the fragment shader 270 through texture mapping. The post fragment shader 290 may access predetermined fragments that are generated by the fragment shader 270 using the frame buffer object within the memory 310.

The mip-map generator 320 may generate a mip-map of the frame buffer object.

The raster operator 280 may directly transmit a result of the raster operation, for example, the raster image or the frame buffer object, to the post fragment shader 290. Through the direction transmission without using the memory 310, it is possible to decrease an unnecessary memory bandwidth use.

Figure 4:
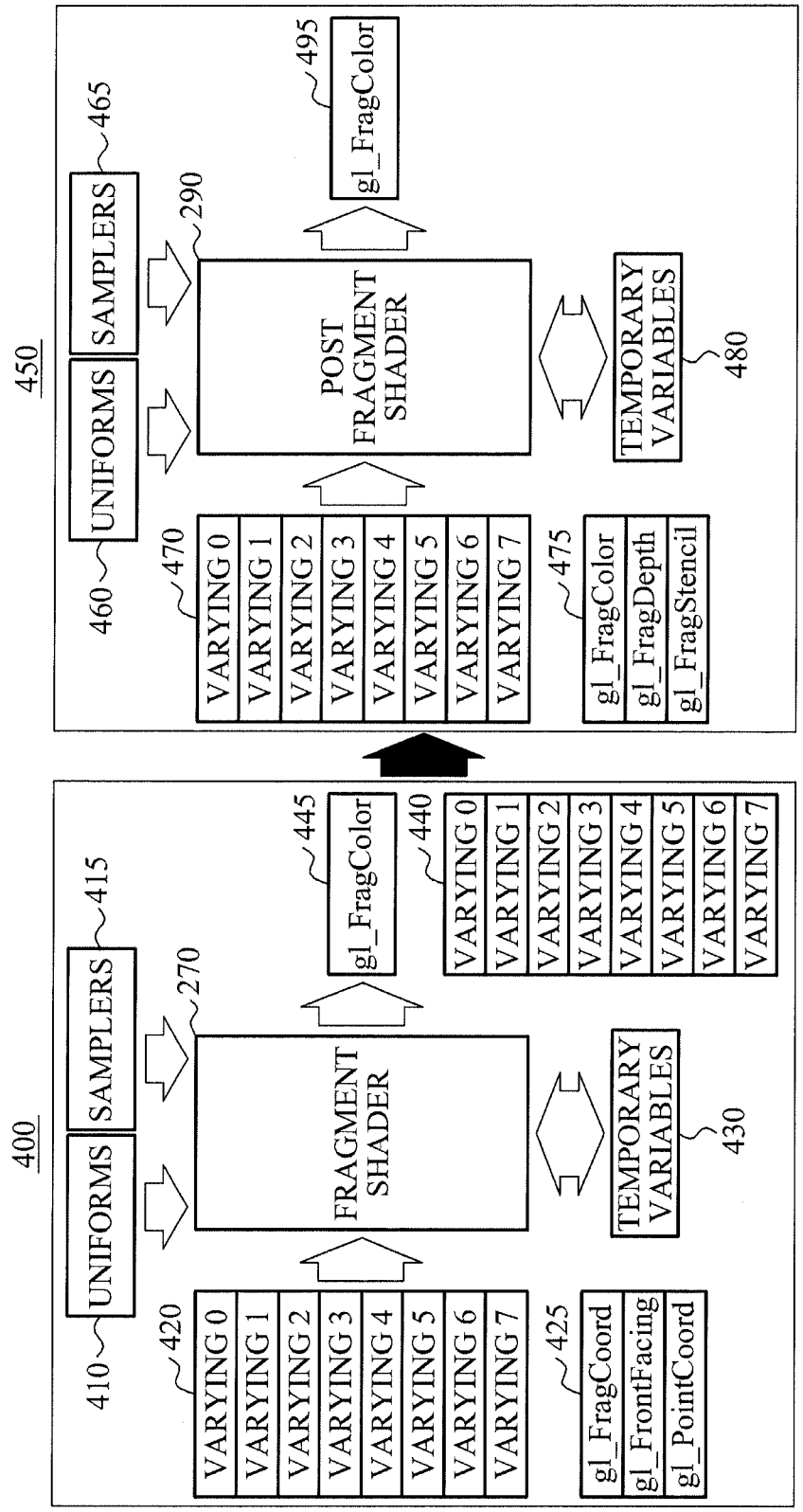
FIG. 4 illustrates input values and output values of a fragment shader and a post fragment shader according to example embodiments.

FIG. 4 illustrates input values and output values of the fragment shader 270 and the post fragment shader 290 according to example embodiments.

A first diagram 400 illustrates input values and output values of the fragment shader 270. A second diagram 450 illustrates input values and output values of the post fragment shader 290.

The fragment shader 270 may use, as input values, uniforms 410, samplers 415, varyings 420 or varying variables, and specific input variables 425. Here, the term "uniform" may indicate constant data that is used by the fragment shader 270, and the term "sampler" may indicate a specific type of uniform indicating textures.

The specific input variables 425 may include "gl_FragCoord", "gl_FrontFacing", "gl_PointCoord", and the like. The fragment shader 270 may use temporary variables 430 as an input value and an output value. The fragment shader 270 may output varyings 440 and specific output variables 445. The specific output variables 445 may include "gl_FragColor" that indicates a color value of a fragment.

The post fragment shader 290 may use, as input values, uniforms 460, samplers 465, varyings 470, and specific input variables 475. The input varyings 470 of the post fragment shader 290 may correspond to the output varyings 440 of the fragment shader 270. Alternatively, the input varyings 470 of the post fragment shader 290 may correspond to an output of the fragment shader 270 that is generated through the raster operation. For example, information about the fragments may be transferred from the fragment shader 270 to the post fragment shader 290 using a varying.

The specific input varyings 475 may include "gl_FragColor", "gl_FragDepth", "gl_FragStencil", and the like. The post fragment shader 290 may use temporary variables 480 as an input value and an output value. The post fragment shader 290 may output specific output variables 495. The specific output variables 495 may include "gl_FragColor" indicating a color value of a fragment.

Figure 5:
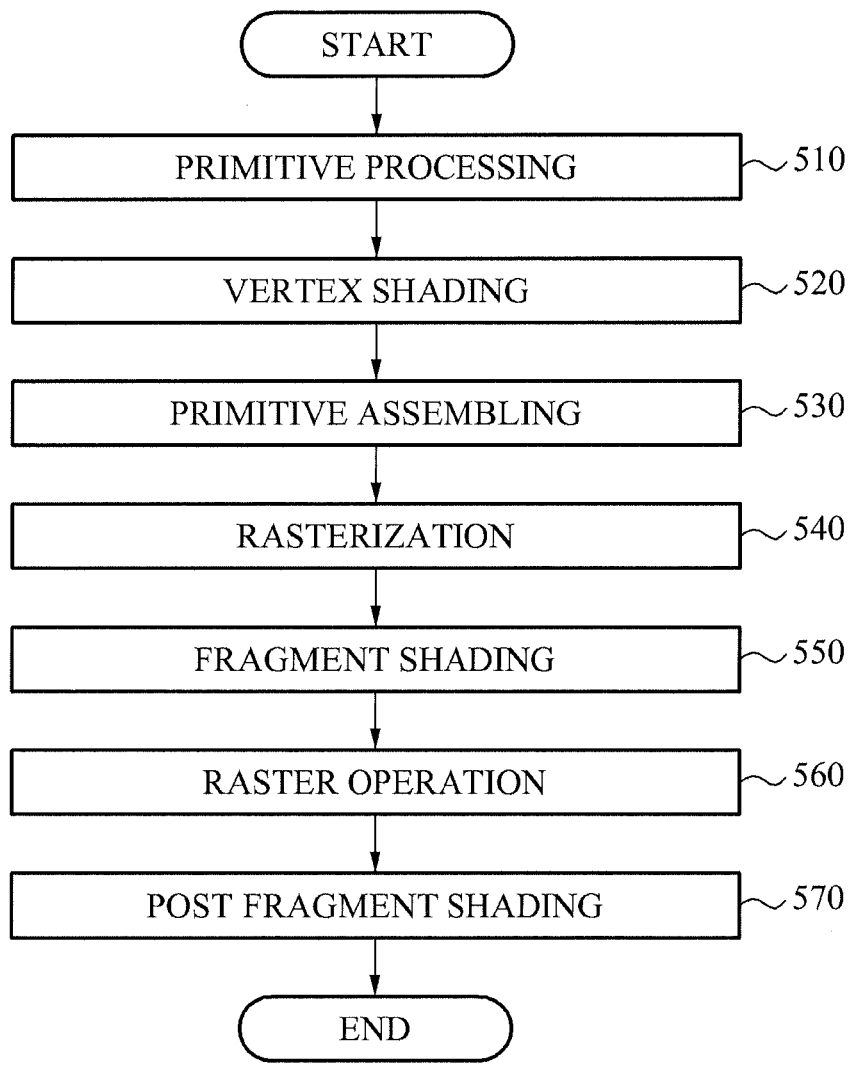
FIG. 5 illustrates a graphics processing method according to example embodiments.

FIG. 5 illustrates a graphics processing method according to example embodiments.

In operation 510, the primitive processor 220 may generate a vertex.

In operation 520, the vertex shader 230 may generate vertex data by transforming a 3D position of the vertex to 2D coordinates and a depth value that are displayed on a screen.

In operation 530, the primitive assembly 240 may collect a run of the vertex data and configure a primitive using the collected run.

In operation 540, the raster 260 may generate fragments within a vertex by interpolating texture coordinates and screen coordinates that are defined in each of vertices within the primitive.

In operation 550, the fragment shader 270 may apply a first effect to each of the fragments.

In operation 560, the raster operator 280 may generate a raster image based on information about the fragments.

In operation 570, a second effect may be applied to each of the fragments within the raster image. The post fragment shader 290 may apply a second effect to each of the fragments within the raster image. The second effect may correspond to a per-fragment effect to be applied to each of fragments within the raster image, based on information about the raster image. The second effect may include at least one of a motion blurring effect, an anti-aliasing effect, a depth of field effect, and a blooming filter effect.

Descriptions made above with reference to FIG. 1 through FIG. 4 may be applied to the present embodiment as is and thus, further detailed descriptions will be omitted here.

The graphics processing method and apparatus according to the above-described example embodiments may use one or more processors, which may include a microprocessor, central processing unit (CPU), digital signal processor (DSP), or application-specific integrated circuit (ASIC), as well as portions or combinations of these and other processing devices.

The example embodiments described herein refer to flowchart illustrations of the apparatus and method for graphics processing using a post fragment shader. It will be understood that each block of the flowchart illustrations, and combinations of blocks in the flowchart illustrations, can be implemented by computer program instructions. These computer program instructions can be provided to one or more processors of a general purpose computer, special purpose computer, or other programmable data processing apparatus to produce a machine, such that the instructions, which execute via the one or more processors of the computer or other programmable data processing apparatus, may implement the functions specified in the flowchart block or blocks.

Each block of the flowchart illustrations may represent a unit, module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The terms "module", and "unit," as used herein, may refer to, but is not limited to, a software or hardware component, such as a Field Programmable Gate Array (FPGA) or Application Specific Integrated Circuit (ASIC), which performs certain tasks. A module or unit may be configured to reside on an addressable storage medium and configured to execute on one or more processors. Thus, a module or unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules/units may be combined into fewer components and modules/units or further separated into additional components and modules.

The graphics processing method according to the above-described embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa.

Although embodiments have been shown and described, it would be appreciated by those skilled in the art that changes may be made in these embodiments without departing from the principles and spirit of the disclosure, the scope of which is defined by the claims and their equivalents.

What is claimed is:

1. A graphics processing apparatus, comprising:
a fragment shader to apply a first effect to a first plurality of fragments;
a raster operator to generate a raster image based on information about the first plurality of fragments; and
a post fragment shader to apply a second effect to a second plurality of fragments within the raster image and to output the raster image applied with the second effect directly to a frame buffer.

2. The graphics processing apparatus of claim 1, further comprising:
a rasterizer to generate the first plurality of fragments within a vertex by interpolating texture coordinates and screen coordinates that are defined in each vertex within a primitive.

3. The graphics processing apparatus of claim 2, further comprising:
a primitive processor to generate the vertex;
a vertex shader to generate vertex data by transforming a three-dimensional (3D) position of the vertex within a virtual space to two-dimensional (2D) coordinates and a depth value that are displayed on a screen; and
a primitive assembly to collect a run of the vertex data, and to configure the primitive using the collected run.

4. The graphics processing apparatus of claim 1, wherein the second effect corresponds to a per-fragment effect to be applied to each of the second plurality of fragments within the raster image, based on information about the raster image.

5. The graphics processing apparatus of claim 1, wherein the second effect comprises at least one of a motion blurring effect, an anti-aliasing effect, a depth of field effect, and a blooming filter effect.

6. The graphics processing apparatus of claim 1, wherein the post fragment shader performs deferred shading by computing a color of each of the second plurality of fragments within the raster image when the raster operators performs a raster operation.

7. The graphics processing apparatus of claim 1, further comprising at least one of a first switch to switch on or off the fragment shader and a second switch to switch on or off the post fragment shader.

8. The graphics processing apparatus of claim 1, further comprising:
a memory to store the raster image as a frame buffer object.

9. The graphics processing apparatus of claim 8, wherein the post fragment shader accesses the first plurality of fragments that are generated by the fragment shader through the frame buffer object.

10. The graphics processing apparatus of claim 1, wherein information about the first plurality of fragments is transferred from the fragment shader to the post fragment shader through a varying.

11. A graphics processing method, comprising:
applying, by first shader, a first effect to a first plurality of fragments;
generating a raster image based on information about the first plurality of fragments;
applying, by a second shader, a second effect to a second plurality of fragments within the raster image; and
outputting, by the second shader, the raster image applied with the second effect to directly a frame buffer.

12. The method of claim 11, further comprising:
generating the first plurality of fragments within a vertex by interpolating texture coordinates and screen coordinates that are defined in each vertex within a primitive.

13. The method of claim 12, further comprising:
generating the vertex;
generating vertex data by transforming a three-dimensional (3D) position of the vertex within a virtual space to two-dimensional (2D) coordinates and a depth value that are displayed on a screen; and
collecting a run of the vertex data to configure the primitive using the collected run.

14. The method of claim 13, wherein the second effect corresponds to a per-fragment effect to be applied to each of the second plurality of fragments within the raster image, based on information about the raster image.

15. The method of claim 11, wherein the second effect comprises at least one of a motion blurring effect, an anti-aliasing effect, a depth of field effect, and a blooming filter effect.

16. A non-transitory computer-readable medium comprising a program for instructing a computer to perform the method of claim 11.

17. A graphics processing apparatus, comprising:
a first fragment shader to apply a first effect to a plurality of fragments;
a raster operator to generate a raster image based on information about the plurality of fragments; and
a second fragment shader to apply a second effect to a plurality of visible fragments within the raster image, and to output the raster image applied with the second effect directly to a frame buffer,
wherein the number of fragments processed by the second fragment shader is less than the number of fragments processed by the first fragment shader.

18. The graphics processing apparatus of claim 17, wherein the first fragment shader removes predetermined fragments using a discard instruction, and
the raster operator generates the raster image by performing a depth test and color blending.

19. The graphics processing apparatus of claim 17, wherein the second fragment shader accesses predetermined fragments generated by the first fragment shader using a frame buffer object.

20. The graphics processing apparatus of claim 17, wherein the raster operator directly transmits the raster image or a frame buffer object to the second fragment shader.

* * * * *